Patented Apr. 17, 1951

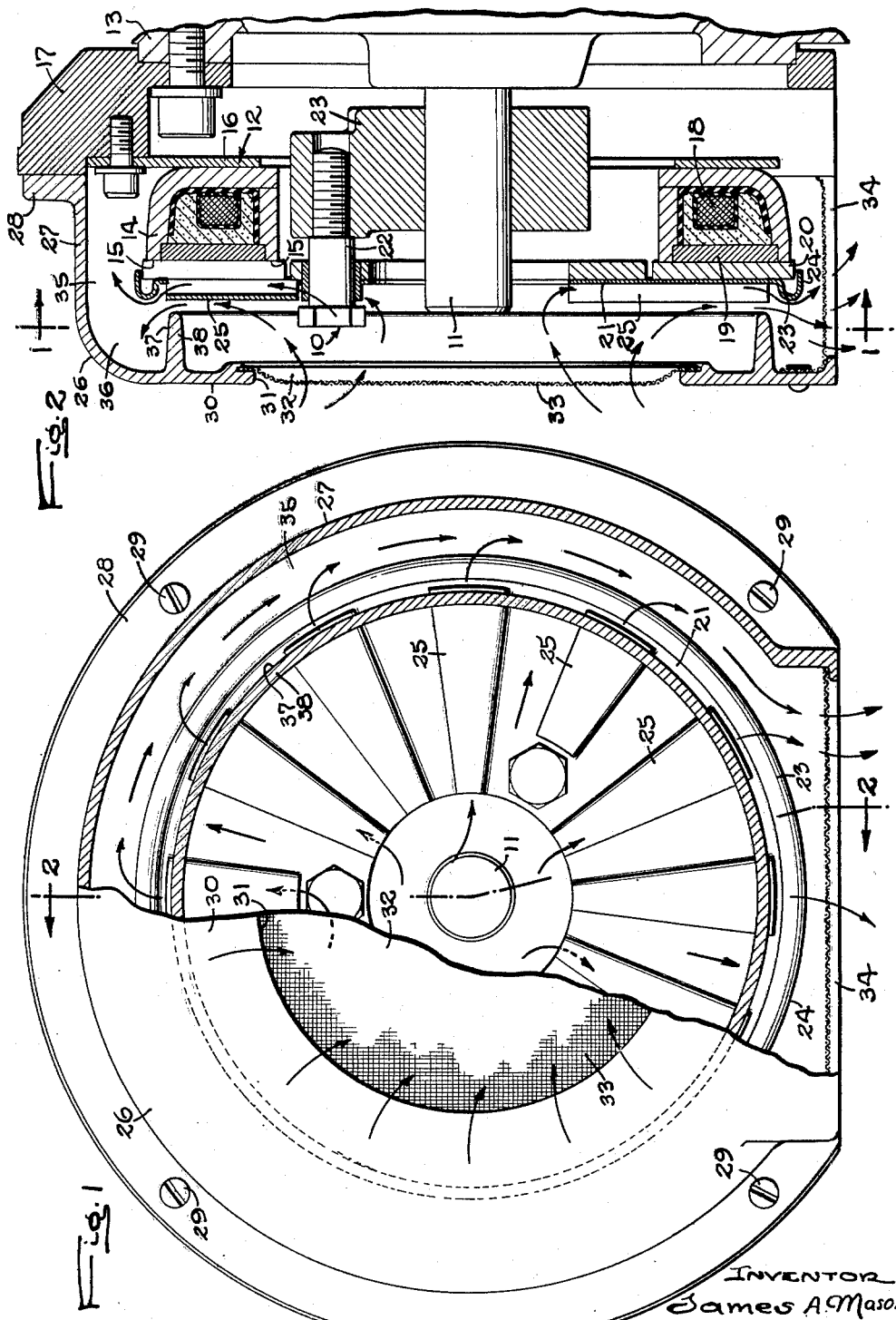

2,549,217

UNITED STATES PATENT OFFICE 2,549,217

FRICTION BRAKE COOLING SYSTEM

James A. Mason, Beloit, Wis., assignor to Warner Electric Brake & Clutch Company, South Beloit, Ill., a corporation of Illinois Application September 27, 1949, Serial No. 118,125

3 Claims. (Cl. 188—264)

This invention relates to the cooling of friction brakes of the type which are enclosed within the housings of electric motors and comprise axially engageable friction elements, one of which carries vanes for inducing the circulation of air around the brake elements.

One object of the invention is to dissipate the frictional heat in a brake of the above character with an optimum efficiency by constructing and arranging the parts of the housing in a novel manner to confine the flow of air along the exposed surfaces of the brake elements in well defined paths from an axial inlet opening to an outlet opening in the housing periphery.

Another object is to construct the end walls of the housing in a novel manner so as to prevent reversal of the direction of flow of air discharged outwardly from the outer ends of the vanes.

Other objects and advantages of the invention will become apparent from the following detailed description taken in connection with the accompanying drawings, in which:

Figure 1 is an end view of a motor brake embodying the present invention with part of the housing broken away, and shown as a section along the line 1—1 of Fig. 2.

Fig. 2 is a fragmentary sectional view taken along the line 2—2 of Fig. 1.

In the drawings, the invention is shown for purposes of illustration incorporated in a friction brake which is adapted for use with an electric motor and has a rotatable element 10 fixed to the motor shaft 11 and a stationary element 12 fixed to the motor housing 13. In this instance, the brake is actuated electrically by a U-shaped magnet which constitutes the stationary brake element and is annular in shape with radially spaced pole pieces 14 terminating in pole faces 15. The magnet is welded or otherwise secured to a plate 16 which is attached to the end wall of the motor housing through the intermediary of an adapter ring 17. Upon the energization of a coil 18 disposed between the pole pieces, the rotatable element 10 which constitutes the magnet armature is drawn into axial gripping engagement with the pole faces. The latter are spanned by the armature and are substantially flush with a friction facing 19 disposed between and supported by the pole pieces.

In this instance the armature comprises a series of segmental plates 20 arranged end to end around the magnet face and individually secured to the inner side of a generally flat supporting disk 21 which is annular in shape and mounted for axial floating movement on angularly spaced pins 22 projecting from a collar 23 fast on the shaft 11 of the motor. If desired, the disk may be strengthened by bending its outer peripheral margin axially in one direction to form a beveled flange 23 and then reversely in the opposite direction to form a cylindrical edge 24.

To cool the braking elements, vanes or ribs 25 disposed on the outer side of the disk 21 are adapted to induce the flow of air outwardly along the disk. Herein, the vanes extend radially of the disk and are formed by depressing segmental portions of the disk axially away from the magnet. The inner and outer ends of the channels between the adjacent vanes are open to enable air to flow outwardly along the inner side of the disk adjacent the magnet as well as between the vanes on the outer side thereof. Such flow of the air is induced by centrifugal action during rotation of the armature.

The parts of the brake are enclosed in a housing 26 which includes a generally cylindrical outer wall 27 substantially larger in diameter than the brake elements and having a flange 28 at its inner end abutting against the adapter ring 17 and secured thereto as by screws 29.

For a purpose to appear later, the outer wall projects axially across and beyond the brake elements 10 and 12 and bends inwardly to merge with a generally flat end wall 30. The inner peripheral edge 31 of the latter is somewhat larger than the inner diameter of the armature ring and defines an air inlet opening 32 which is covered by a screen 33. A relatively large opening 34 formed in the lower portion of the outer housing wall 27 constitutes a discharge outlet for the air circulated through the annular chamber 35 formed by the housing around the brake elements.

In fans of this general type, it is desirable in order to provide for efficient circulation that the air be discharged from the outer ends of the vanes 25 into an open or a relatively large space. To achieve that end, the outer wall 27 of the housing 26 is extended axially and the outer portion of the end wall 30 is spaced from the vanes to provide an extension 36 of the annular chamber 35 disposed axially beyond the brake elements 10 and 12. It is also advantageous to space the inner portion of the end wall 30 a substantial distance axially from the vanes 25 to afford air from the inlet opening 32 free access to the inner ends of the vanes.

The present invention contemplates efficient cooling of the brake elements by confining the flow of the air discharged from the outer ends of the vanes 25 to well defined paths around the elements to the outlet 34 without providing alternative paths through which the air may by-pass the brake elements. This is accomplished through the provision of a wall 37 which defines the inner periphery of the extension 36 of the air chamber 35 and prevents the air discharged outwardly into the latter from reversing its direction of flow and flowing inwardly toward the inner ends of the vanes. In the present instance, the wall is formed by the outer surface of an annular rib 38 concentric with the axis of the brake elements and preferably cast integral with the end wall 30. The rib extends axially toward the vanes from the inner side of the end wall with the inner end of the rib spaced sufficiently close to the vanes to substantially close the chamber extension 36 on the inner side thereof.

The rib 38 is preferably located radially between the ends of the vanes and is spaced far enough from the outer ends thereof to minimize interference with air being directed outwardly by the vanes thereby restricting to a lesser degree the flow of air into the annular chamber 35. This is especially important where the fan must operate in either direction of rotation. By spacing the rib from the inner vane ends, the latter are left exposed and easily accessible to air flowing inwardly through the inlet opening 32.

With the housing 26 and the brake elements constructed as above described, air is induced to flow from the inlet opening 32 to the inner ends of the vanes and outwardly along both faces of the armature beyond the outer periphery of the latter, the direction of flow being indicated by arrows in the drawings. The air thus discharged from the outer ends of the vanes tends to flow around the beveled flange 23 into the annular chamber 35 and directly into the chamber extension 36. Because the rib 38 is disposed sufficiently close to the vanes to prevent the discharged air from reversing its direction of flow and flowing inwardly toward the inner ends of the vanes, all of the air delivered by the fan tends to follow the paths of least resistance and flow circumferentially around the outer periphery of the brake elements to the discharge outlet 34. Thus, the air is forced to flow along well defined paths past and around the exposed surfaces of the brake elements to cool the latter effectually.

I claim as my invention:

1. The combination of a nonrotatable friction element having an axially facing friction surface, a coacting disk-like friction element mounted to rotate about the axis of said first element and adapted on one side for axial gripping engagement with said friction surface, angularly spaced outwardly extending vanes on the other side of said rotatable element operable to induce a flow of air outwardly along the rotatable element, and means defining an annular air chamber surrounding said friction elements and projecting axially across and beyond the peripheries of said elements, said means including an outer peripheral wall larger than said rotatable element and having an outwardly facing opening which constitutes an air outlet, an end wall axially spaced outwardly from said vanes, and an annular inner peripheral wall smaller in diameter than said rotatable element and extending from said end wall axially and inwardly toward said vanes, the inner end of said inner wall being disposed radially between the ends of said vanes and sufficiently close to the latter to prevent the air discharged from the outer ends of the vanes from reversing its direction of flow and flowing inwardly toward the inner ends of the vanes.

2. The combination of a nonrotatable friction element having an axially facing friction surface, a coacting disk-like friction element mounted to rotate about the axis of said first element and adapted on one side for axial gripping engagement with said friction surface, angularly spaced outwardly extending vanes on the other side of said rotatable element operable to induce a flow of air outwardly along the rotatable element, and means defining an annular air chamber surrounding said friction elements and projecting axially across the peripheries of the elements and beyond the outer ends of said vanes, said means including an outer peripheral wall larger than said rotatable element and having an outwardly facing opening which constitutes an air outlet, an end wall parallel to said rotatable element and axially spaced outwardly therefrom, and an annular rib smaller in diameter than said rotatable element and extending from said end wall axially and inwardly toward said vanes with its inner end disposed sufficiently close to the latter to prevent air in said annular chamber from flowing inwardly toward the inner ends of the vanes.

3. The combination of, a nonrotatable friction element having an axially facing friction surface, a coacting disk-like friction element mounted to rotate about the axis of said first element and adapted on one side for axial gripping engagement with said friction surface, angularly spaced outwardly extending vanes on the other side of said rotatable element operable to induce a flow of air outwardly along the rotatable element, and means defining an annular air chamber surrounding said friction elements and projecting axially across the peripheries of the elements and beyond the outer ends of said vanes, said means including an outer peripheral wall larger than said rotatable element and having an outwardly facing opening which constitutes an air outlet, an end wall axially spaced outwardly from said vanes, and an inner peripheral wall smaller than said rotatable element and extending from said end wall inwardly toward said vanes with its inner end disposed sufficiently close to the vanes to prevent the air discharged from the outer ends of the vanes from reversing its direction and flowing inwardly toward the inner ends of the vanes.

JAMES A. MASON.

REFERENCES CITED

The following references are of record in the file of this patent:

UNITED STATES PATENTS

| Number | Name | Date |
|---|---|---|
| 992,883 | Kwis | May 23, 1911 |
| 1,434,770 | Bryson | Nov. 7, 1922 |
| 1,614,976 | Wrenn | Jan. 18, 1927 |
| 1,678,945 | Jones | July 31, 1928 |
| 1,948,037 | Kingston | Feb. 20, 1934 |
| 2,481,402 | Dederick | Sept. 6, 1949 |